Feb. 10, 1970  D. I. DENNY  3,494,635
VEHICLE TOW TRAILER

Filed Oct. 9, 1967  2 Sheets-Sheet 1

INVENTOR.
DONALD I. DENNY
BY Malcolm L. Moore
ATTORNEY

Feb. 10, 1970  D. I. DENNY  3,494,635
VEHICLE TOW TRAILER
Filed Oct. 9, 1967  2 Sheets-Sheet 2
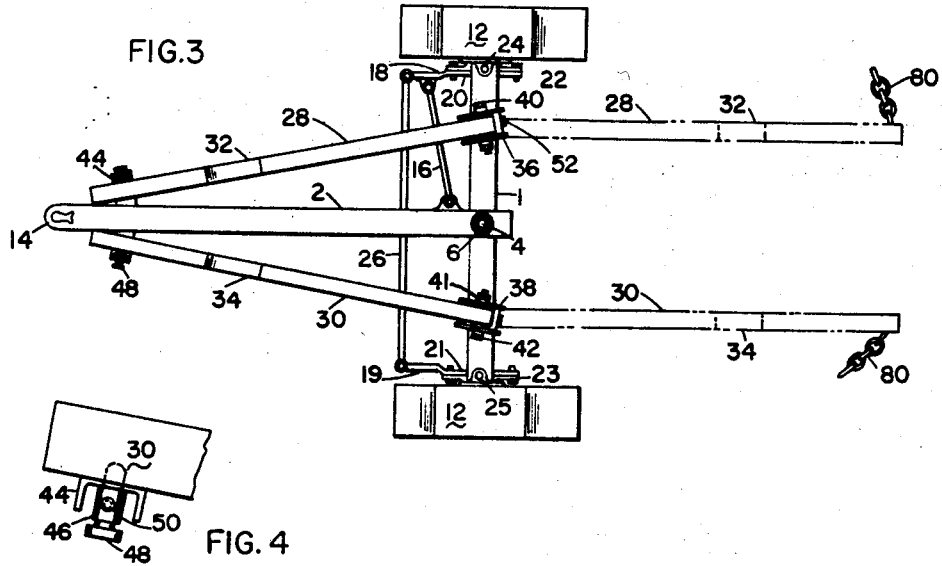
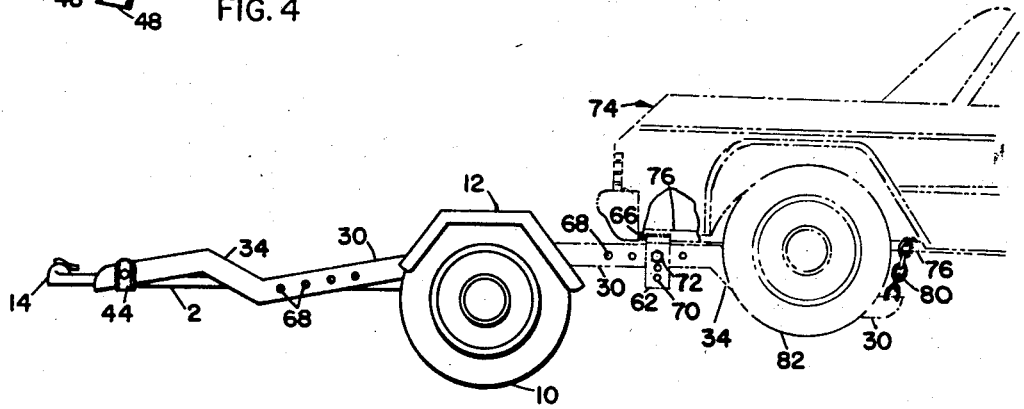
INVENTOR.
DONALD I. DENNY
BY
Malcolm L. Moore
ATTORNEY

United States Patent Office 3,494,635
Patented Feb. 10, 1970

3,494,635
VEHICLE TOW TRAILER
Donald Irvine Denny, La Crosse, Wis., assignor to Toter, Inc., La Crescent, Minn., a corporation of Minnesota
Filed Oct. 9, 1967. Ser. No. 673,816
Int. Cl. B62d *53/04;* B60d *1/14*
U.S. Cl. 280—402                             8 Claims

ABSTRACT OF THE DISCLOSURE

A compact, two-wheeled tow trailer having a pivotal draw bar with trailer wheel turning linkage connected thereto is provided with two spaced-apart tow arms mounted in brackets on its axle for pivotal movement through vertical arcs. The tow arms may be swung from a forward position where they lock against the draw bar and prevent it from pivoting and turning the trailer wheels to a rear, towing position where they support the frame of a disabled vehicle. The tow arm support brackets are releasably mounted on the trailer axle and may be angled inwards so as to direct the tow arms inwardly towards the draw bar for attachment thereto in their forward position.

---

This invention relates to a tow trailer which has been particularly designed with a view towards compactness, light weight and adaptability for attachment behind any ordinary automobile, pick-up truck or jeep for towing virtually any type of four-wheeled vehicle.

One of the basic objectives of this invention is to provide a compact tow trailer having two wheels which are turnable when a vehicle is being towed and which are prevented from turning when the trailer is being pulled with no disabled vehicle mounted on it.

This objective is achieved in a relatively simple manner by the combination of a pivotal draw bar, which actuates the trailer wheel turning linkage, with vertically pivotal tow arms secured to the trailer axle which lock the draw bar so as to prevent it from turning the trailer wheels when said arms are pivoted to their forward, non-towing position. When pivoted to a rear, towing position, the tow arms serve to support the frame of the vehicle being towed.

A particularly advantageous feature of my invention lies in the use of releasably mounted brackets having beveled side faces to support the tow arms on the trailer axle. The beveled faces permit the brackets to be turned inwards and thereby angle the tow arms inwardly towards the draw bar for attachment to a bracket mounted thereon. By releasably mounting the brackets on the trailer axle, the brackets and the tow arms may be slid to different positions on the axle so that the tow arms may accommodate different size vehicle frames in their rear, towing position.

These and other features and objectives of my invention will become readily apparent as the following description is read in conjunction with the accompanying drawings, of which:

FIGURE 3 is a top view of the trailer of this invention;

FIGURE 4 is an enlarged, fragmentary top view of the bracket and lock pin arrangement for securing the tow arms to the draw bar; and FIGURE 5 is a side elevation view of the trailer of this invention.

Figures 1, 2:
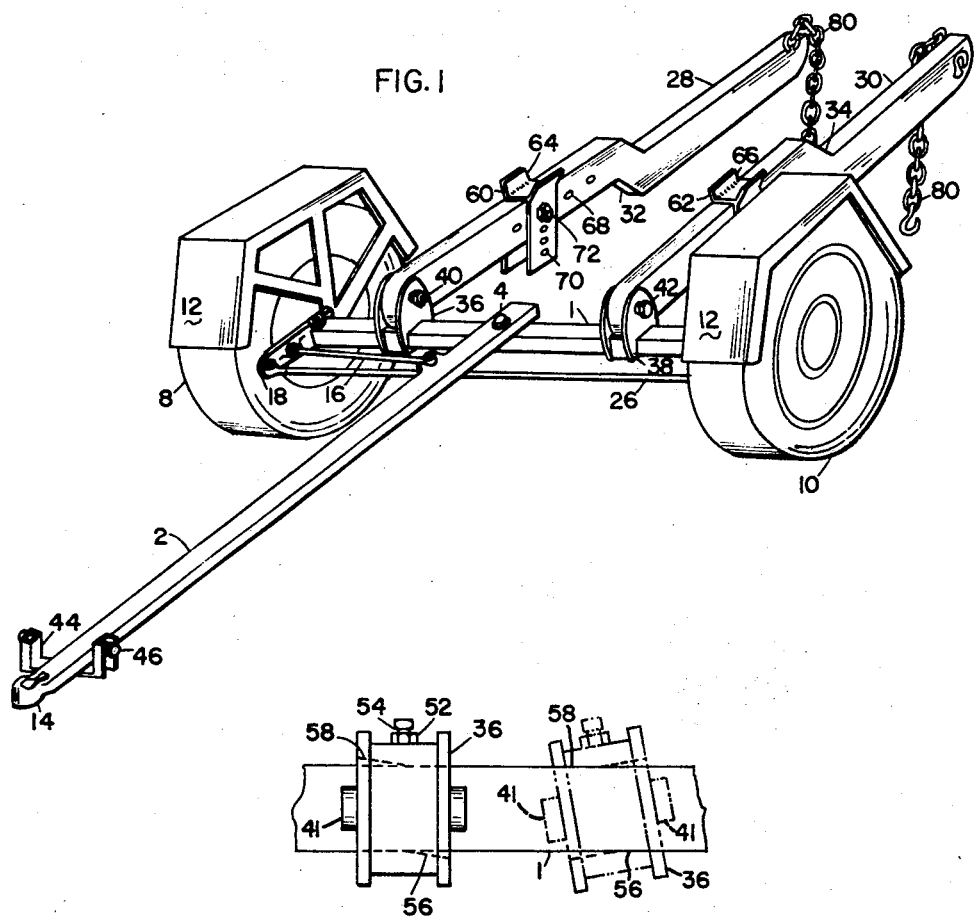
FIGURE 1 is a perspective view of my improved trailer.
FIGURE 2 is an enlarged, fragmentary top view of the tow arm mounting brackets of FIGURE 1.

My unique trailer is designed to support any type of four-wheeled vehicle for towing movement behind a small tow vehicle such as an ordinary automobile or a light pick-up truck. To this end, the tow trailer is provided with a draw bar 2 and tow arms 28 and 30 mounted on an axle 1 having wheels 8 and 10 supported on the opposite ends thereof. Fenders 12 cover wheels 8 and 10. Tongue or draw bar 2 is pivotally secured to axle 1 by bolt 4 extending through pivot sleeve or bushing 6. Draw bar 2 may be connected to a hitch on the rear end of a tow car or truck by socket 14 at its forward end. Wheels 8 and 10 are supported on axle 1 for turning movement by means of a conventional arrangement of knuckles 22 and 23 through which king pins 24 and 25 extend. In order to turn knuckles 22 and 23, a turning linkage arrangement is provided for actuation by the pivotal movement of draw bar 2. Tie rod 16 connects the rear end of draw bar 2 with turning arm 18, flanged extension 20 of which is fastened to knuckle 22. A second tie rod 26 connects arm 18 to a similar arm 19 which is fastened to knuckle 23 by flanged extension 21. The pivotal movement of draw bar 2 on axle 1 causes tie rod 16 attached thereto to turn wheels 8 and 10 through interconnecting arms 18, 19 and tie rod 26.

As may best be seen in FIGURES 1 thru 3, tow arms 28 and 30 are pivotally mounted on spaced-apart brackets 36 and 38 by bolts 40 and 42, which pass through bracket collars 41. Brackets 36 and 38 are releasably secured to axle 1 for sliding movement thereon by set screws 54 engaged in bracket weld nuts 52. With particular reference to FIGURE 2, the inner sides of brackets 36 and 38 are provided with angled or beveled faces 56 and 58. By loosening set screws 54 and twisting brackets 36 and 38 so that beveled faces 56 and 58 bear against axle 1 in the manner indicated in phantom lines in FIGURE 2, tow arms 28 and 30 will be made to angle inwardly when pivoted to their forward, non-towing position as shown in solid lines in FIGURE 3.

In the forward position of FIGURE 3, inwardly directed tow arms 28 and 30 rest in bracket 44 which is welded or otherwise fastened to the forward end of draw bar 2. FIGURE 4 shows in detail the arrangement of sleeves 46 and pins 48 by which arms 28 and 30 may be locked to the forward end of draw bar 2. Pins 48 are inserted through horizontally extending bracket sleeves 46 into aligned holes in arms 28 and 30, and are locked in place by lock pins or cotter pins 50. When so secured to draw bar 2, tow arms 28 and 30 prevent it from pivoting on axle 1 and turning wheels 8 and 10.

Horizontally spaced holes 68 in tow arms 28 and 30 permit the adjustable mounting of support brackets 60 and 62 thereon in the manner indicated in FIGURE 1. Bolt 72 is inserted through one of the vertically spaced holes 70 in brackets 60, 62 and a selected one of the holes 68. The forward end of the frame of the vehicle to be towed rests in U-shaped portions 64 and 66 of brackets 60, 62.

In operation, the tow trailer is hitched to a tow car with arms 28 and 30 secured to draw bar 2 in the forward position shown in solid lines in FIGURE 3. Draw bar 2 is thus restrained from pivoting, and wheels 8 and 10 cannot turn as the trailer is pulled to the site of a disabled vehicle. Upon reaching the vehicle to be towed, tow arms 28 and 30 are disengaged from draw bar 2 by removing pin 48 from bracket 44. Set screws 54 are then loosened and brackets 36 and 38 are twisted to the straight position indicated in solid lines in FIGURE 2. After arms 28 and 30 are swung through a substantially vertical arc to the rear, towing position shown in phantom lines in FIGURE 3 and in solid lines in FIGURE 1, brackets 36 and 38 may be slid in or out on axle 1 so that arms 28 and 30 will be in the proper position to accommodate the frame of a disabled vehicle. Set screws 54 are then tightened. The front end of a disabled vehicle 74 (FIGURE 5) will normally be jacked up with its front wheels 82 off the ground, and the tow trailer is rolled back so that arms 28 and 30 extend under it. It is to be noted that arms 28 and 30 have inclined portions 32 and 34, which angle downwardly and outwardly when arms 28 and 30 are in their rear, towing position. By virtue of this arrangement, the outer ends of arms 28 and 30 will be at a lower level permitting them to more easily slide under the frame 76 of vehicle 74. Brackets 60 and 62 are then mounted in the necessary position on arms 28 and 30 using a pair of holes 68, 70 which will properly position the brackets with respect to frame 76 of disabled vehicle 74. Since tow arms 28 and 30 are freely pivotal on the horizontal axes defined by bolts 40 and 42 of brackets 36 and 38, these arms can be swung all the way downwardly into contact with the ground to facilitate their movement into position under the front end of the vehicle to be towed. Tow arms 28 and 30 are lifted up so that the opposite sides of vehicle frame 76 rest in U-shaped portions 64 and 66 of brackets 60 and 62 as shown in FIGURE 5. In order to fasten arms 28 and 30 to vehicle 74, chains 80 attached to said arms are secured around the opposite sides of frame 76. The trailer and vehicle 74 are now in the proper position for towing as shown in FIGURE 5. The front end of vehicle 74 and tow arms 28 and 30 are held suspended in the elevated position of FIGURE 5 by the opposing forces acting on arms 28 and 30 at the spaced apart points determined by the location of brackets 36 and 38 and connecting chains 80. The downward force exerted on arms 28 and 30 at brackets 36 and 48 by the weight of vehicle 74 is countered by the opposite, upward force on the outer ends of arms 28 and 30 exerted through chains 80. By reason of their attachment to frame 76 of vehicle 74, chains 80 resist the downward movement of the outer ends of arms 28 and 30, and without such separating movement between said tow arms and vehicle frame 76, arms 28 and 30 cannot pivot completely downwardly into contact with the ground.

With tow arms 28 and 30 in their rear, towing position, draw bar 2 is free to pivot on axle 1. Thus, as the tow car or truck turns, draw bar 2 pivots back and forth and turns trailer wheels 8 and 10 by means of the aforesaid tie rod turning linkage. The turning action of trailer wheels 8 and 10 is necessary to permit the rear wheels of towed vehicle 74 to negotiate corners without sliding and dragging.

It is noteworthy that in some cases the vehicle to be towed can be jacked up with the trailer itself so that a separate jack will not be required. With vehicles such as jeeps which have frames which are relatively high above the ground, the trailer may be used as a jack by raising draw bar 2, rolling arms 28 and 30 under the vehicle frame, and then pushing down on draw bar 2 so that brackets 60 and 62 come up under the sides of the frame. The lever action of draw bar 2 will raise the vehicle off the ground. Whether a separate jack or the trailer itself is used to provide the lifting action, the tow trailer may be attached to either the front or rear end of the vehicle to be towed.

The above-described tow trailer offers the particular advantages of being small, compact, inexpensive and easy to use. The trailer may be used to tow virtually any type of four-wheeled vehicle and may be pulled by any ordinary passenger car, jeep or small truck. Any garage or service station could thus utilize the trailer of this invention to go into the towing business without having to make a major investment in a winch-equipped tow truck.

The particular embodiment of the invention which I have shown and described is intended to be illustrative only. The tow trailer could be modified and refined in various ways, such as by putting springs between tow arms 28, 30 and axle 1 to act as a suspension system for the vehicle being towed. Also brackets having some type of swivel mounted tow arm engaging portion could be used in place of beveled face brackets 36 and 38 to turn tow arms 28 and 30 inwardly towards draw bar 2.

I claim:
1. A vehicle tow trailer comprising:
an axle having wheels mounted on the opposite ends thereof;
draw bar means secured to said axle and extending forwardly therefrom for attachment to a tow vehicle;
two spaced-apart brackets mounted on said axle;
two tow arms, one end of each of said tow arms being pivotally secured to one of said brackets for swinging movement about horizontal axes, said tow arms being freely swingable from a first forward position of non-use to a second, rearwardly extending towing position in which they project substantially horizontally to support the frame of a vehicle to be towed; and
means for securing said tow arms to said draw bar means when said tow arms are swung to said forward position.

2. A vehicle tow trailer as defined in claim 1 wherein:
said draw bar means is pivotally mounted on said axle; and further including:
linkage mechanism for turning said wheels connected to said draw bar means for actuation thereby; and
said means securing said tow arms to said draw bar means when said tow arms are in said forward position being so constructed and arranged as to prevent the pivotal movement of said draw bar means and the turning of said wheels.

3. A vehicle tow trailer as defined in claim 1 wherein:
said tow arms are comprised of inner and outer sections interconnected by an inclined portion which angles outwardly and downwardly when said tow arms are swung through a substantially vertical arc to said rear, towing position, thereby disposing said outer sections of said tow arms at a relatively low level so as to permit them to be easily moved under the frame of a vehicle to be towed.

4. A vehicle tow trailer comprising:
an axle having wheels turnably mounted on the opposite ends thereof;
draw bar means pivotally secured to said axle, and extending forwardly therefrom for attachment to a tow vehicle;
linkage mechanism for turning said wheels connected to said pivotal draw bar means for actuation by the pivotal movement thereof;
vehicle support means supported on said axle, said support means being movable from a first, forward position to a second, rear, towing position; and
means securing said support means to said draw bar means when said support means is in said first, forward position, whereby said support means restrain said draw bar means from pivotal movement and prevent the turning of said wheels.

5. A vehicle tow trailer as defined in claim 4 wherein:
said draw bar means is in the form of a single bar; and
said vehicle support means comprises a pair of tow arms supported on said axle by two spaced-apart brackets mounted on said axle so as to be turnable from a straight-forward position at substantially right angles to said axle to an inwardly angled position in which said brackets direct said tow arms inwardly towards said draw bar for locking attachment thereto in said forward position.

6. A vehicle tow trailer as defined in claim 5 wherein:
each of said brackets has beveled faces which bear against said axle when said brackets are turned to said inwardly angled position.

7. A vehicle tow trailer as defined in claim 4 wherein:
said vehicle support means comprises a pair of tow arms pivotally mounted at one end thereof in two spaced-apart brackets secured to said axle, said tow arms being swingable in substantially vertical arcs in said brackets from said first, forward position to said second, rear, towing position.

8. A vehicle tow trailer as defined in claim 1, and further including:
an upwardly opening saddle bracket mounted on each of said tow arms intermediate the ends thereof, said saddle brackets being adapted to receive a portion of the forward end of the frame structure of a vehicle to be towed; and
a length of chain attached to the outer end of each of said tow arms, the attachment of said chains to a portion of the frame structure of said vehicle being towed rearwardly of the point of support of said vehicle on said saddle brackets serving to securely support the front end of said vehicle in an elevated position.

References Cited

UNITED STATES PATENTS

| | | | |
|---|---|---|---|
| 1,456,875 | 5/1923 | Jacobsen | 280—63 |
| 1,764,971 | 6/1930 | Nilson | 280—402 |
| 2,553,229 | 5/1951 | Barhorst. | |
| 2,701,069 | 2/1955 | Hawkins. | |

FOREIGN PATENTS

| | | |
|---|---|---|
| 962,025 | 4/1957 | Germany. |
| 455,401 | 10/1936 | Great Britain. |

LEO FRIAGLIA, Primary Examiner

U.S. Cl. X.R.

214—86